(12) United States Patent
Matsuo et al.

(10) Patent No.: US 7,295,541 B2
(45) Date of Patent: Nov. 13, 2007

(54) NETWORK CONTROL APPARATUS, WIRELESS TERMINAL AND COMMUNICATION CONTROL METHOD

(75) Inventors: Ryoko Matsuo, Tokyo (JP); Shuichi Sekine, Kanagawa-Ken (JP); Takayoshi Ito, Kanagawa-Ken (JP); Hiroki Shoki, Kanagawa-Ken (JP); Yutaka Asanuma, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 713 days.

(21) Appl. No.: 10/721,466

(22) Filed: Nov. 26, 2003

(65) Prior Publication Data

US 2004/0147226 A1 Jul. 29, 2004

(30) Foreign Application Priority Data

Nov. 27, 2002 (JP) ............................. 2002-344418

(51) Int. Cl.
  *H04Q 7/24* (2006.01)
  *H04Q 7/20* (2006.01)
(52) U.S. Cl. ................. 370/338; 455/427; 455/441
(58) Field of Classification Search ............... 370/338; 455/427, 441
  See application file for complete search history.

(56) References Cited

U.S. PATENT DOCUMENTS 6,345,186 B1 * 2/2002 Schultz et al. ............. 455/441
6,735,438 B1 * 5/2004 Sabatino ..................... 455/427
2002/0160773 A1 * 10/2002 Gresham et al. ............ 455/431
2004/0147226 A1 7/2004 Matsuo et al.

OTHER PUBLICATIONS

U.S. Appl. No. 10/423,946, filed Apr. 28, 2003, Matsuo et al.
U.S. Appl. No. 10/422,699, filed Apr. 25, 2003, Sekine et al.
U.S. Appl. No. 10/440,114, filed May 19, 2003, Aoki et al.
U.S. Appl. No. 10/440,115, filed May 19, 2003, Sakata et al.
U.S. Appl. No. 10/721,466, filed Nov. 26, 2003, Matsuo et al.
U.S. Appl. No. 10/737,762, filed Dec. 18, 2003, Shoki et al.
U.S. Appl. No. 10/751,497, filed Jan 6, 2004, Sekine et al.
U.S. Appl. No. 11/411,854, filed Apr. 27, 2006, Shoki et al.

* cited by examiner

*Primary Examiner*—Joseph Feild
*Assistant Examiner*—Kiet Doan
(74) *Attorney, Agent, or Firm*—Oblon, Spivak, McClelland, Maier & Neustadt, P.C.

(57) ABSTRACT

A wireless control apparatus which performs a wireless communication with a plurality of wireless terminals, comprising: an evaluation signal receiver configured to receive evaluation signals relating to received signals in the respective wireless terminals, which are transmitted from the plurality of wireless terminals; a supplement signal deciding unit which decides a supplement signal necessary to supplement the received signals in the plurality of wireless terminals; and a supplement signal transmitter configured to transmit the supplement signal decided by the supplement signal deciding unit, to the plurality of wireless terminals.

14 Claims, 11 Drawing Sheets

| USER NAME | Bit rate | PROPAGATION ENVIRONMENT | PROCESSING STATE | REQUEST INFORMATION |
|---|---|---|---|---|
| USER 1 | 300 kb/s | Good | Idle | INFORMATION x |
| USER 2 | 64 kb/s | Bad | Busy | INFORMATION y |
| USER 3 | 200 kb/s | Normal | Busy | INFORMATION x |
| USER 4 | 32 kb/s | Normal | Idle | INFORMATION x |
| USER 5 | 300 kb/s | Normal | Idle | INFORMATION x |
| USER 6 | 2 Mb/s | Good | Idle | INFORMATION x |
| · | · | · | · | · |
| · | · | · | · | · |

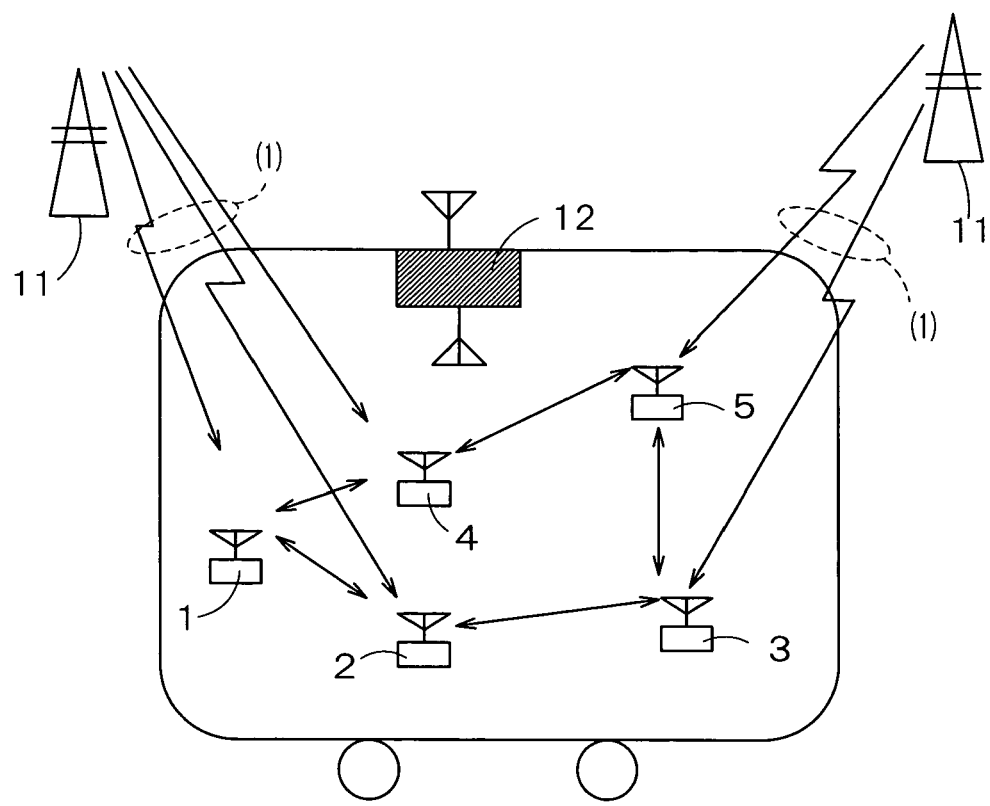
F I G. 12
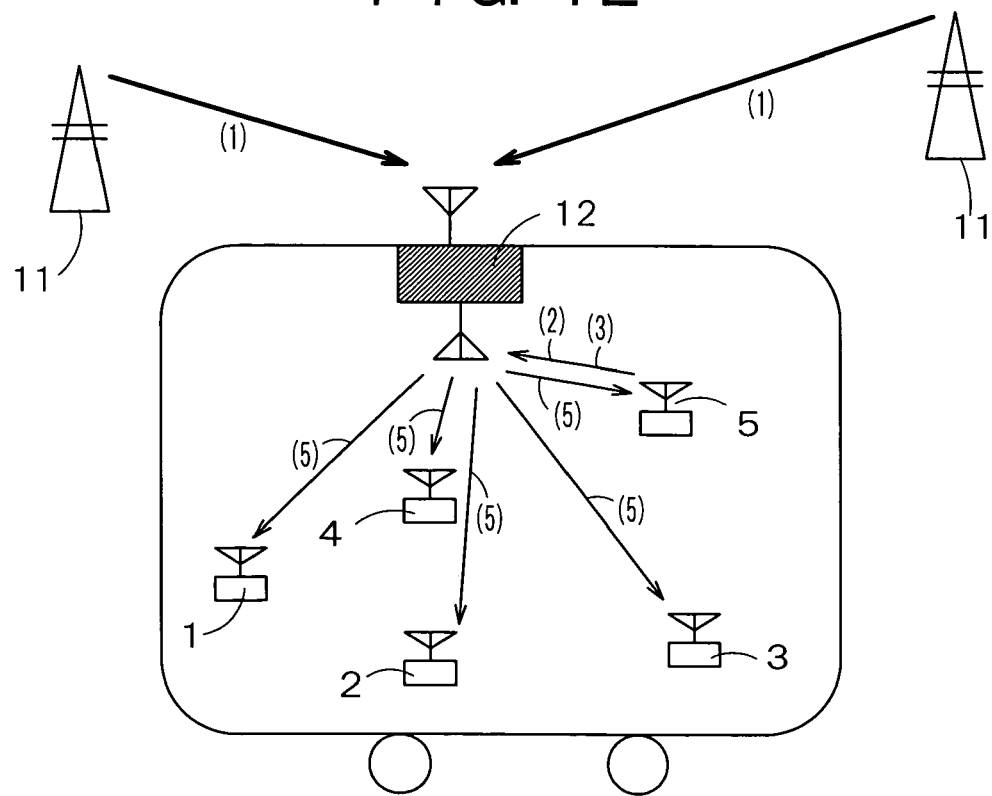
F I G. 13

NETWORK CONTROL APPARATUS, WIRELESS TERMINAL AND COMMUNICATION CONTROL METHOD

CROSS REFERENCE TO RELATED APPLICATIONS

This application claims benefit of priority under 35 USC § 119 to Japanese Patent Application No. 2002-344418, filed on Nov. 27, 2002, the entire contents of which are incorporated by reference herein.

BACKGROUND OF THE INVENTION

1. Field of the Invention

The present invention relates to a network control apparatus, a wireless terminal and a communication control method used in a distributed wireless network system, which performs wireless communication, while a plurality of wireless terminals are relaying information signal to each other.

2. Related Art

In the distributed wireless network in which a plurality of wireless terminals communicate with each other, a method for efficiently downloading by means of downloading in group is disclosed (for example, see Japanese Laid-open publication No. 2002-132613 (pages 1 to 8, FIG. 1).

The wireless distributed wireless network has an advantage in that it is possible to temporarily construct a LAN (Local Area Network) at a certain range, without connecting to a backbone network. In a future wireless communication, it is anticipated that other kinds of communication besides sound signal such as motion pictures and data will be performed frequently, the quantity of transmitted signal by the wireless terminals at a spot area or at mobile environment will rapidly increase, and the transmission rate will also increase.

When the information signal quantity increases or the transmission rate increases, there may be the possibility that the whole information signal cannot be received accurately with only one wireless terminal. Particularly, when the wireless terminal is moving at a high speed as in a train or a bus, or in a place where the wireless environment is bad, this problem is serious. In order to handle this problem, the present applicant has proposed a method in which when a wireless terminal requests reception of information signal in a large quantity, the wireless terminal cooperates with other wireless terminals in the same distributed wireless network to receive the desired information signal, the reception requesting terminal coordinates the information signal received by the respective wireless terminals, and the coordinated information signal is distributed to the wireless terminal which has requested reception (see Japanese Patent Application No. 2002-127282).

However, this method has two problems described below.

1. One of the wireless terminals in the distributed wireless network collects the information signal received by the respective wireless terminals and coordinates the information signal as single information signal. However, the processing becomes a large load according to the capacity of the terminal which performs processing.
2. Since the function and capacity are different for each wireless terminal in the distributed wireless network, if the reception processing is allocated to each terminal under the same condition, the processing time of the terminal having small capacity affects other wireless terminals.

Moreover, if it is assumed that the distributed wireless network is constructed in trains or buses, it is expected that the access to the distributed wireless network by the wireless terminals is too frequent. In such a case, the system in which a plurality of terminals simply cooperate with each other would never be preferable.

SUMMARY OF THE INVENTION

In view of the above situation, it is an object of the present invention to provide a network control apparatus, a wireless terminal and a communication control method, which can improve the communication quality and communication efficiency of a plurality of wireless terminals forming a distributed wireless network.

A wireless control apparatus according to one embodiment of the present invention which performs a wireless communication with a plurality of wireless terminals, comprising:

an evaluation signal receiver which receives evaluation signals relating to received signals in the respective wireless terminals, which are transmitted from said plurality of wireless terminals;

a supplement signal generating unit configured to generate a supplement signal necessary to supplement deficient part of the received signals in said plurality of wireless terminals, using the evaluation signal; and a supplement signal transmitter which transmits the supplement signal decided by said supplement signal generating unit, to said plurality of wireless terminals.

Furthermore, a wireless terminal according to one embodiment of the present invention configured to performs wireless communication with a wireless control apparatus which transmits a supplement signal necessary to supplement deficient part of a received signal, comprising:

a transmitter which transmits an evaluation signal relating to the received signal to said wireless control apparatus;

a supplement signal receiver which receives the supplement signal; and a supplement information receiver which receives information based on the supplement signal.

Furthermore, a communication control method which communicates with a wireless control apparatus which performs wireless communication with said wireless terminals, comprising:

receiving evaluation signals at an evaluation signal receiver of said wireless control apparatus, transmitted from the respective wireless terminals;

generating a supplement signal necessary to supplement deficient part of the received signals received at said plurality of wireless terminals, using the evaluation signal; and transmitting said supplement signal to said plurality of wireless terminals.

BRIEF DESCRIPTION OF THE DRAWINGS

FIG. 12 is respectively illustrations showing a network configuration in modified examples of the fourth embodiment.

FIG. 13 is respectively illustrations showing a network configuration in modified examples of the fourth embodiment.

DESCRIPTION OF THE PREFERRED EMBODIMENTS

The network control apparatus, the wireless terminal and the communication control method will be described specifically, with reference to the drawings.

First Embodiment

Figure 1:
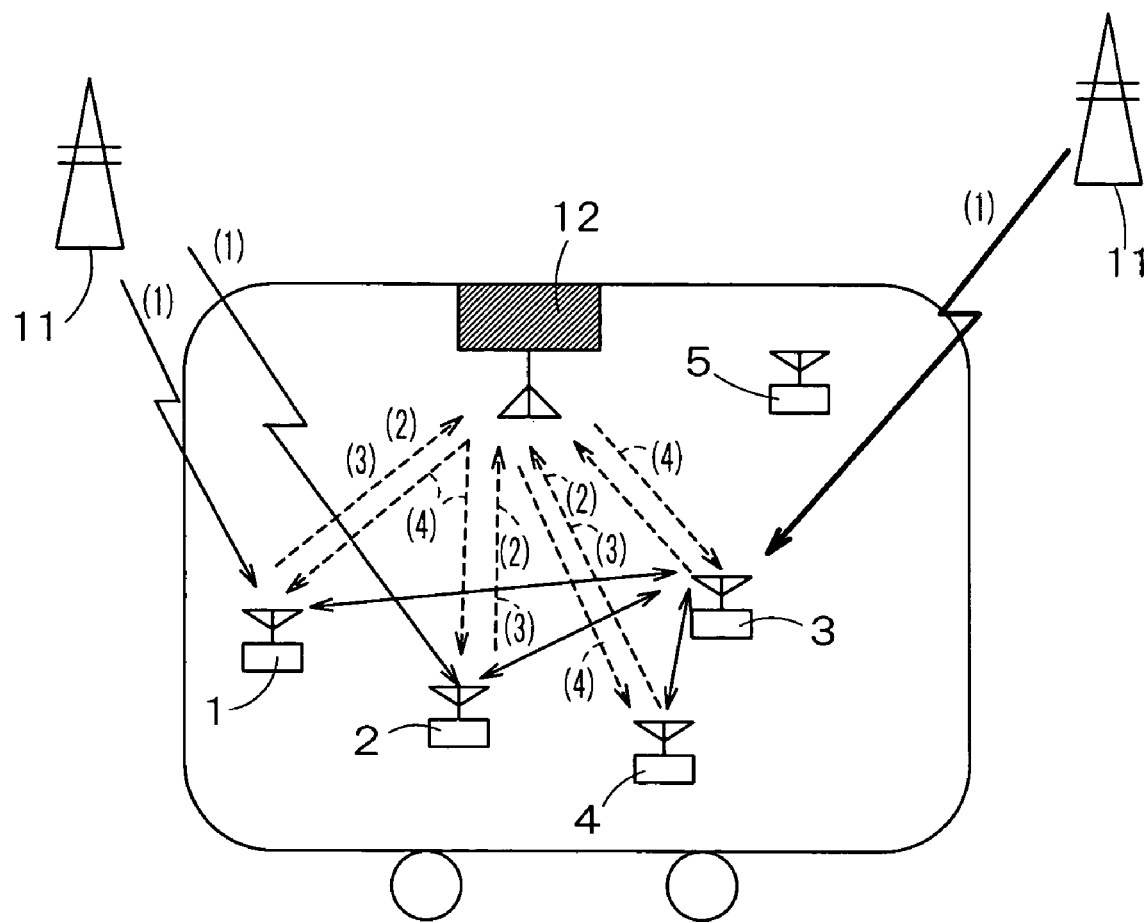
FIG. 1 is a diagram showing a network configuration according to a first embodiment of a distributed wireless network system.

FIG. 1 is a diagram showing a network configuration according to a first embodiment of a distributed wireless network system. The distributed wireless network system in FIG. 1 has wireless terminals 1 to 5 respectively held by a plurality of persons in a vehicle such as a train or bus, a base station 11 which is installed outside of the vehicle and transmits various information signal to the respective wireless terminals 1 to 5, and a control terminal 12 installed at a position where the propagation environment is relatively good, such as a ceiling of the vehicle.

The wireless terminals 1 to 5 and the control terminal 12 form the distributed wireless network. Here, the distributed wireless network stands for a network in which the respective terminals have a relay function, and the respective terminals cooperate with each other to transmit information signal between the base station 11 and the respective wireless terminals.

It is assumed here that the wireless terminals 1 to 4 request reception of information signal in a large quantity from the base station 11.

It is assumed here that the wireless terminals 1 to 3 correspond to a cellular system or a wireless LAN, which receives information signal via the base station 11 such as CDMA, PDC (Personal Digital Cellular) and PHS (Personal Handy Phone System), and also correspond to the distributed wireless network, and are so-called multi-system type terminals. On the other hand, the wireless terminal 4 corresponds only to the distributed wireless network.

At first, after having received information signal (1) from the base station 11 individually, the wireless terminals 1 to 3 transmit information signal for identifying the respective wireless terminals 1 to 3 (hereinafter referred as individual terminal information signal (2)), and a signal indicating a part deficient in received information signal, propagation situation, terminal capability and the like (hereinafter, referred as an evaluation signal (3)), to the control terminal 12.

The wireless terminal 4 transmits the evaluation signal (3) indicating that the information signal (1) has not been received to the control terminal 12 together with the individual terminal information signal (2).

Here, it is assumed that the wireless terminal 3 can normally receive the information signal (1) because the propagation situation is good, or the terminal capability is high, and the wireless terminals 1 and 2 have a part deficient in the received information signal (hereinafter, referred as "deficiency information signal"). In this case, the control terminal 12 transmits a signal indicating a part to be supplemented by the respective terminals (hereinafter referred as a supplement signal (4)) to the respective wireless terminals, based on the deficiency information signal in the evaluation signal (3) transmitted from the respective wireless terminals.

In the embodiment shown in FIG. 1, the signal received by the wireless terminal 3 having excellent propagation situation and terminal performance is used to supplement signals of other wireless terminals. The control terminal 12 transmits the supplement signal (4) instructing to supplement the information signal (1) from the wireless terminals 3, to the respective wireless terminals 1 to 5.

The respective wireless terminals 1 to 5 transmit the evaluation signal (3) again to the wireless terminal 3, according to the supplement signal (4). The wireless terminal 3 receives the deficiency information signal instructed by the evaluation signal (3) from the wireless terminal 3, and transmits the received deficiency information signal to other wireless terminals 1, 2, 4 and 5.

As in this embodiment, when the other wireless terminals 1, 2, 4 and 5 supplement information signal only from the wireless terminal 3, the evaluation signals for the other wireless terminals 1, 2, 4 and 5 may be transmitted beforehand from the control terminal 12 to the wireless terminal 3. As a result, the wireless terminal 3 can understand beforehand which wireless terminal is deficient in which information signal. Therefore, the wireless terminals 1, 2, 4 and 5 are unnecessary to transmit the evaluation signal again to the wireless terminal 3, and can promptly receive the deficient information signal from the base station 11 to transmit it to the other terminals 1, 2, 4 and 5.

As described above, in the first embodiment, the evaluation signal (3) transmitted from the respective wireless terminals 1 to 5 to the control terminal 12 is transmitted to the wireless terminal 3 having a good propagation environment, which have correctly received the information signal (1), and the wireless terminal 3 receives the deficiency information signal from the base station 11 and transmits the information signal to the other wireless terminals 1, 2, 4 and 5. As a result, all wireless terminals that have not correctly received the information signal can obtain the deficiency information signal via the wireless terminal 3, thereby improving the communication reliability.

Second Embodiment

In the second embodiment, a plurality of wireless terminals in the distributed wireless network receives information signal from the base station 11 by cooperating to each other, according to the instruction from the control terminal 12.

Figure 2:
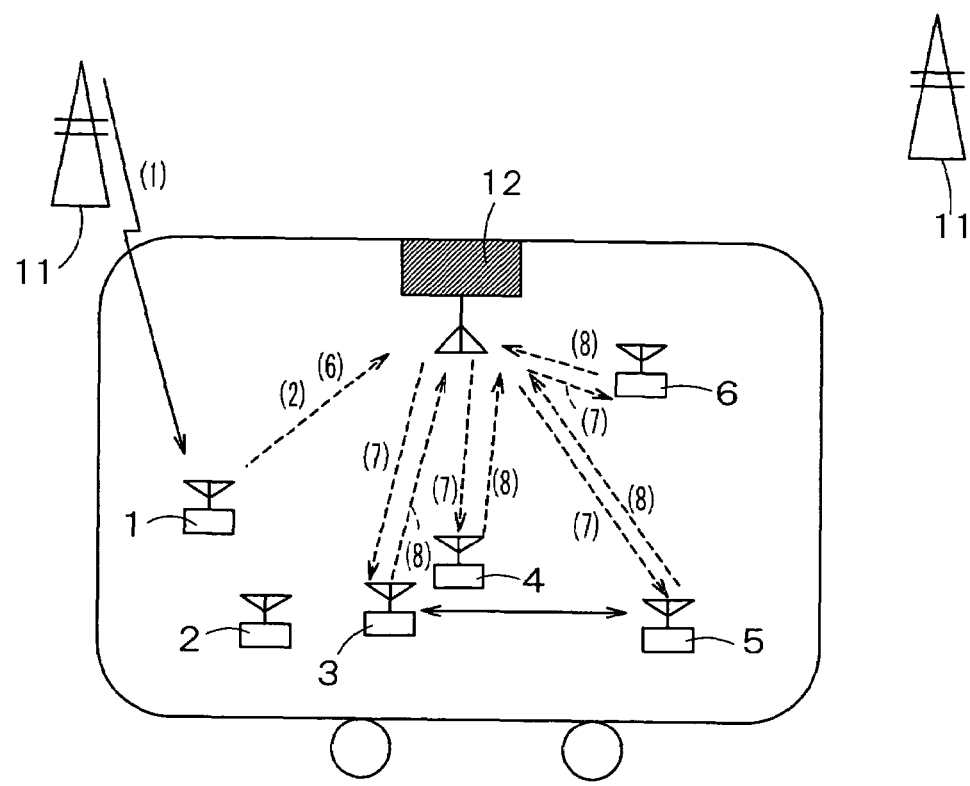
FIG. 2 is a diagram showing a network configuration according to a second embodiment of a distributed wireless network system.
Figure 3:
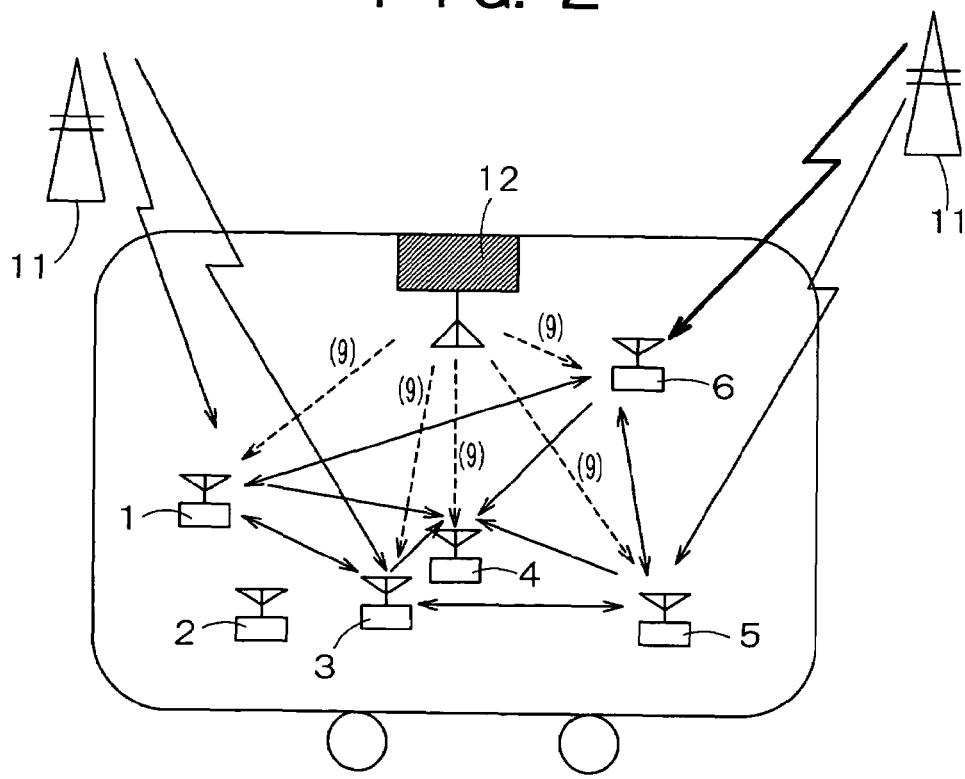
FIG. 3 is a diagram showing a network configuration according to a second embodiment of a distributed wireless network system.

FIGS. 2 and 3 are diagrams showing a network configuration according to the second embodiment of the distributed wireless network system. The distributed wireless network system according to the second embodiment has wireless terminals 1 to 6 respectively held by a plurality of persons in a vehicle, a control terminal 12 installed on the ceiling or the like in the vehicle, and a base station 11 installed outside of the vehicle, similarly to the first embodiment.

It is assumed here that the wireless terminal 1 requests reception of information signal in a large quantity that cannot be received by the wireless terminal 1 itself to the wireless base station 11. In this case, as shown in FIG. 2, the wireless terminal 1 transmits the individual terminal information signal (2), and a cooperative reception request signal & desired received signal information signal (6), to the control terminal 12.

Next, the control terminal 12 transmits a cooperation request signal & received signal information signal (7) to other wireless terminals 2 to 6 in the distributed wireless network. The respective wireless terminals 2 to 6 reply an Ack/Nack (8) indicating whether to cooperate or not to the control terminal 12.

The control terminal 12 controls as database the information signal relating to propagation situation and terminal capability of the other wireless terminals 2 to 6 which cooperate with the wireless terminal 1, among the evaluation signals (3) received beforehand from the wireless terminals. The control terminal 12 determines an assignment signal (9) indicating assigned parts to be received by the wireless terminals 2 to 6, and informs the respective wireless terminals of the assigned parts.

As shown in FIG. 3, the wireless terminals having received the assignment signal (9) individually receive the information signal from the base station 11, and transmit the received information signal to other wireless terminals. FIG. 3 illustrates an example in which the control terminal 12 has not given the reception request to the wireless terminal 4.

In this case, the wireless terminal 4 only receives the information signal from other wireless terminals.

Figures 4, 5:
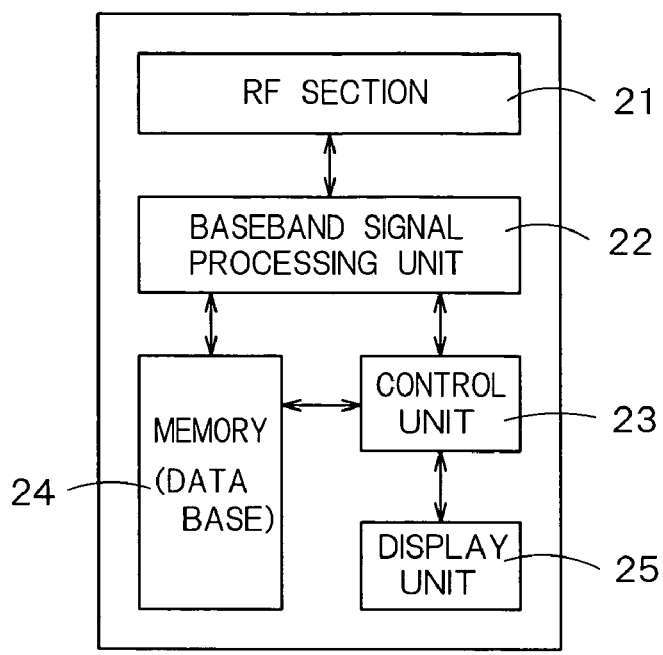
FIG. 4 is a block diagram indicating one example of the internal configuration of the control terminal 12 according to the second embodiment.
FIG. 5 indicates one example of the database in the memory 24, which stores data such as bit rates, propagation environments, processing state and request information signal of the respective wireless terminals.

FIG. 4 is a block diagram indicating one example of the internal configuration of the control terminal 12 according to the second embodiment. The control terminal 12 has a RF unit 21 which performs transmission and reception of an analog wireless signal, and D/A conversion (from a digital signal to an analog wireless signal) or A/D conversion of the other way around, a baseband signal processing unit 22 which performs signal processing of the digital signal, a control unit 23 which controls the RF unit 21, the baseband signal processing unit 22 and the like, a memory 24, and a display unit 25.

A database is provided in the memory 24, and the database stores the information signal of the propagation situation and the terminal capability of the respective terminals existing in the same distributed wireless network.

FIG. 5 indicates one example of the database in the memory 24, which stores data such as bit rates, propagation environments, processing state and request information signal of the respective wireless terminals. For example, if it is assumed that the information signal shown in FIG. 5 is held by the control terminal 12, the control terminal 12 assigns the largest partial charge of the received information signal to the wireless terminal 6 having a good propagation environment and a high-speed bit rate, and assigns the partial charge lower than that of the wireless terminal 6, to the wireless terminals 1, 3 and 5 having medium bit rates and propagation environments. The propagation environment of the wireless terminal 4 is the same level as that of the wireless terminal 3, but the corresponding bit rate is low. Because of this, any partial charge is not assigned to the wireless terminal 4 in this embodiment.

In this embodiment, there is shown a case in which assignment is determined by the bit rate and the propagation environment, but the assignment may be performed based on the processing state of the respective wireless terminals, or an item other than those shown in FIG. 5 may be added in the database in the memory 24, and assignment may be performed based on the added item.

Figure 6:
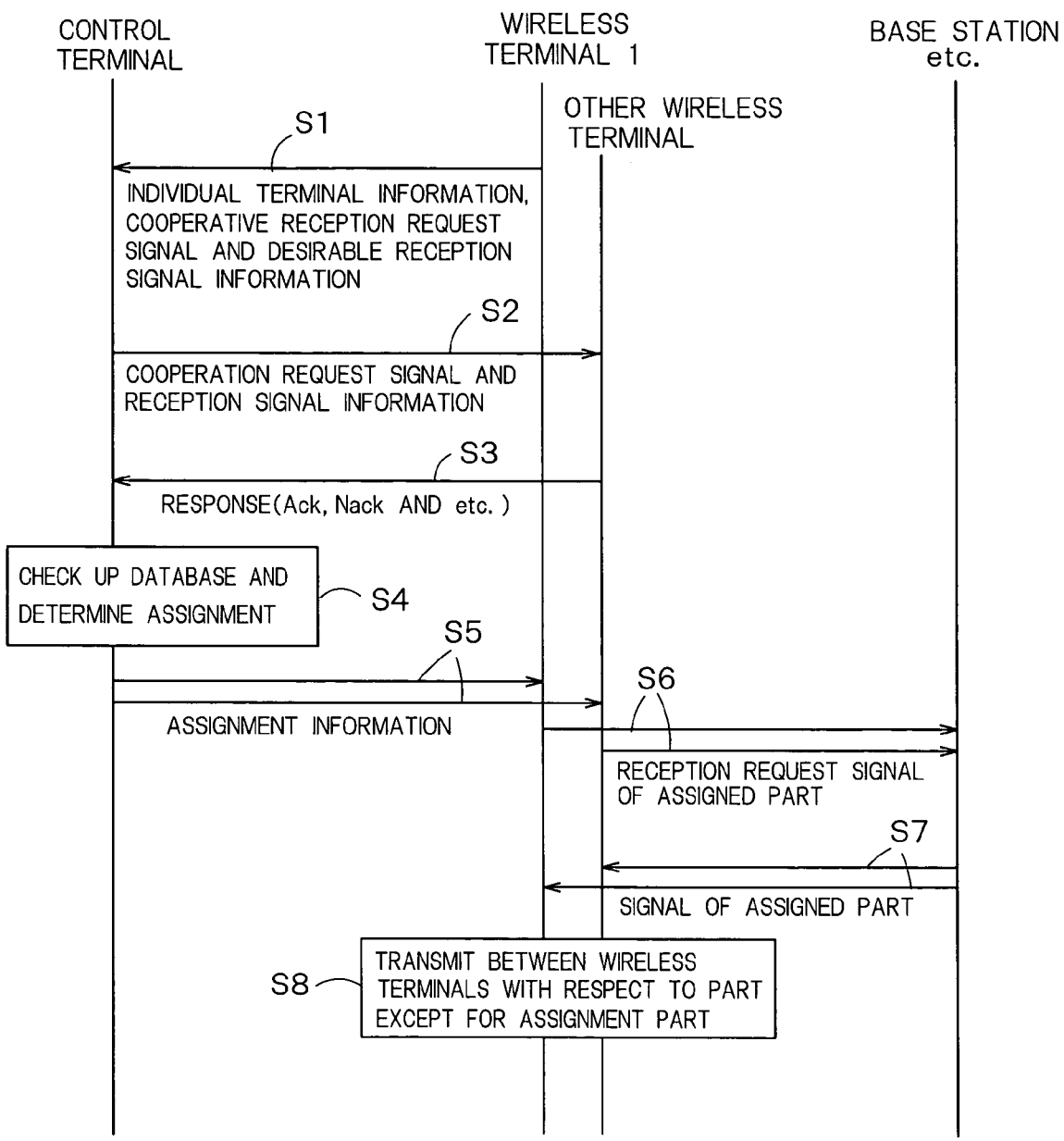
FIG. 6 is a flowchart indicating the processing procedure in the second embodiment of the distributed wireless network system.

FIG. 6 is a flowchart indicating the processing procedure in the second embodiment of the distributed wireless network system. At first, the wireless terminal 1 transmits the individual terminal information signal for identifying its own terminal, a cooperative reception request signal for requesting cooperative reception to other wireless terminals, and received signal information signal relating to the cooperation-requested received information signal to the control terminal 12 (step S1). The control terminal 12 having received this signal transmits a cooperation request signal & the received signal information signal to other wireless terminals (step S2). The other wireless terminals having received this signal transmit a response (Ack or Nack) indicating whether to cooperate for the reception to the control terminal 12 (step S3).

The control terminal 12 then checks up the database shown in FIG. 5 in the memory 24, to determine the assignment to the respective wireless terminals (step S4), and transmits the assignment information signal to the respective wireless terminals (step S5).

The respective wireless terminals having received the assignment information signal respectively transmit a reception request signal for the assigned part to the base station 11 or the like (step S6). The base station 11 transmits the requested information signal to the respective wireless terminals (step S7).

The wireless terminals other than the wireless terminal 1 transmit the assignment information signal having received by its own terminal to the wireless terminal 1 (step S8).

As described above, in the second embodiment, when a certain wireless terminal requests cooperative reception to the control terminal 12, the control terminal 12 determines the reception assignment for the respective wireless terminals, taking into consideration the transmission rate and the propagation environment of the respective wireless terminals. Therefore, a plurality of wireless terminals can receive the desired information signal most efficiently by cooperatively receiving the information signal. The information signal received by the assigned respective wireless terminals can be reliably delivered to the wireless terminal which has made the request, since the information signal is transmitted between the respective wireless terminals.

Third Embodiment

In the third embodiment, the control terminal 12 relays transmission of the deficiency information signal.

Figure 7:
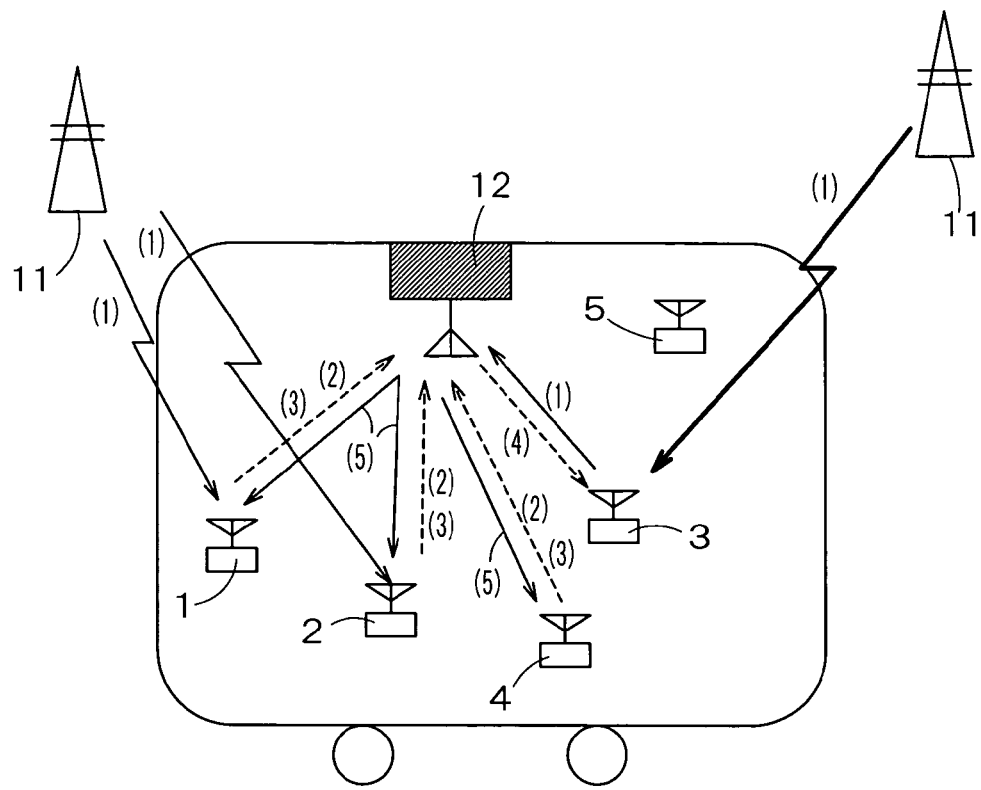
FIG. 7 is a diagram showing a network configuration according to the third embodiment of the distributed wireless network system.

FIG. 7 is a diagram showing a network configuration according to the third embodiment of the distributed wireless network system. Hereafter, points different from the first embodiment will be mainly explained. FIG. 7 indicates an example in which the propagation environment of the wireless terminal 3 is the best. In this case, the control terminal 12 transmits a supplement signal (4) instructing supplement of information signal to the wireless terminal 3.

The wireless terminal 3 having received the supplement signal (4) receives the information signal (1) for supplement from the base station 11, and transmits the received information signal (1) for supplement to the control terminal 12. The control terminal 12 transmits the deficiency information signal (5) to the respective wireless terminals, based on the evaluation signal indicating the part deficient in the received information signal, the propagation situation and the terminal capability of the respective wireless terminals. At this time, the control terminal 12 transmits the whole information signal to the wireless terminal 4, which has not received any information signal 1 from the base station 11.

If there is no wireless terminal which has not received any information signal 1, and all the wireless terminals have received the same information signal 1 from the base station 11 or the like beforehand, and only the deficient part is respectively requested, the control terminal 12 receives only the deficiency information signal (5) of the respective wireless terminals from the wireless terminal 3.

In this manner, since the control terminal 12 adjusts the received information signal of the respective wireless terminals, even if the respective wireless terminals cannot receive the whole information signal by themselves, or even if there is a failure in reception, the whole information signal can be finally received accurately. Moreover, by efficiently transmitting only the information signal relating to the deficient part, congestion in the distributed wireless network can be reduced.

Figure 8:
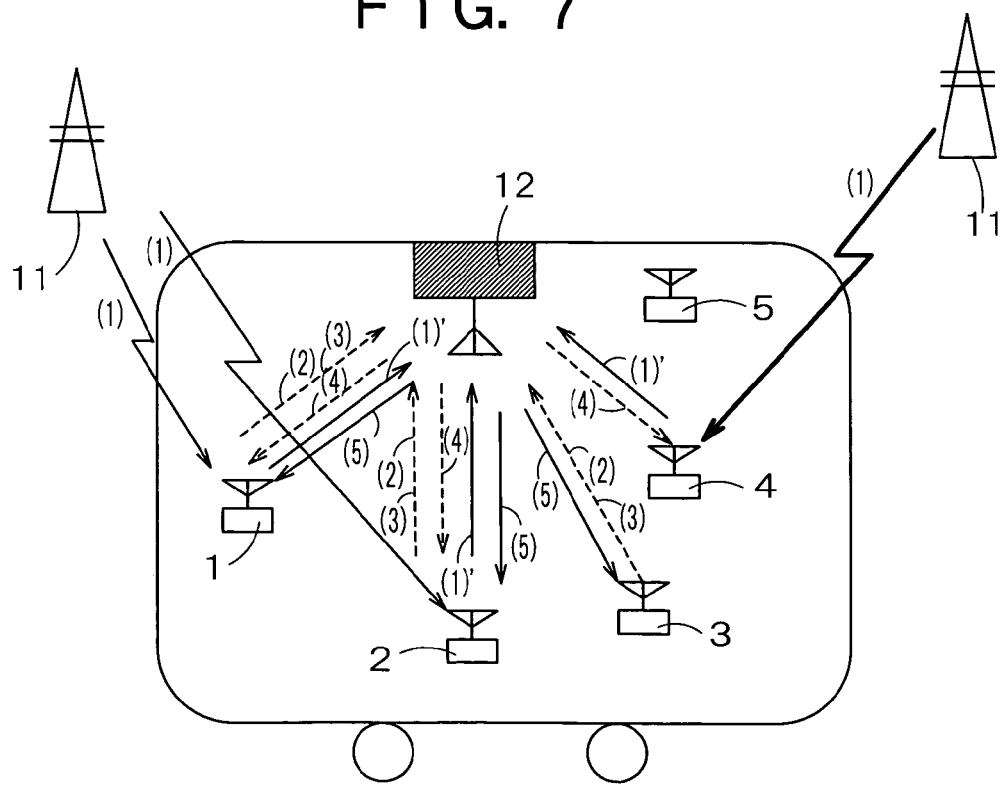
FIG. 8 is a diagram showing the network configuration when the control terminal requests transmission of information signal relating to a deficient part in a wireless terminal.

FIG. 8 is a diagram showing the network configuration when the control terminal 12 requests transmission of information signal relating to a deficient part in a wireless terminal, to all wireless terminals receiving the same information signal. In this case, the control terminal 12 transmits the supplement signal (4) to all wireless terminals 1, 2 and 4 receiving the same information signal.

The respective wireless terminals transmit supplement information signal (1') indicated by the supplement signal (4) to the base station 11, and receive deficiency information signal (5) in its own terminal from the base station 11.

Since the control terminal 12 transmits the supplement information signal (1') and the deficiency information signal (5) between the respective wireless terminals and the control terminal 12, the throughput of the control terminal 12 itself increases than that shown in FIG. 7, but since the information signal of the respective wireless terminals can be effectively used, an advantage similar to that of the diversity reception can be obtained.

Particularly, in FIG. 7, when the propagation situation and the terminal performance or the like of the wireless terminal 3 are substantially equal to those of other wireless terminals, or when the propagation situation of the wireless terminals 1 and 2 is not so bad, the method shown in FIG. 8 is effective. Therefore, it can be considered to use the methods shown in FIG. 7 and FIG. 8 selectively according to the processing capacity of the control terminal 12 itself and the propagation situation of other wireless terminals.

Figure 9:
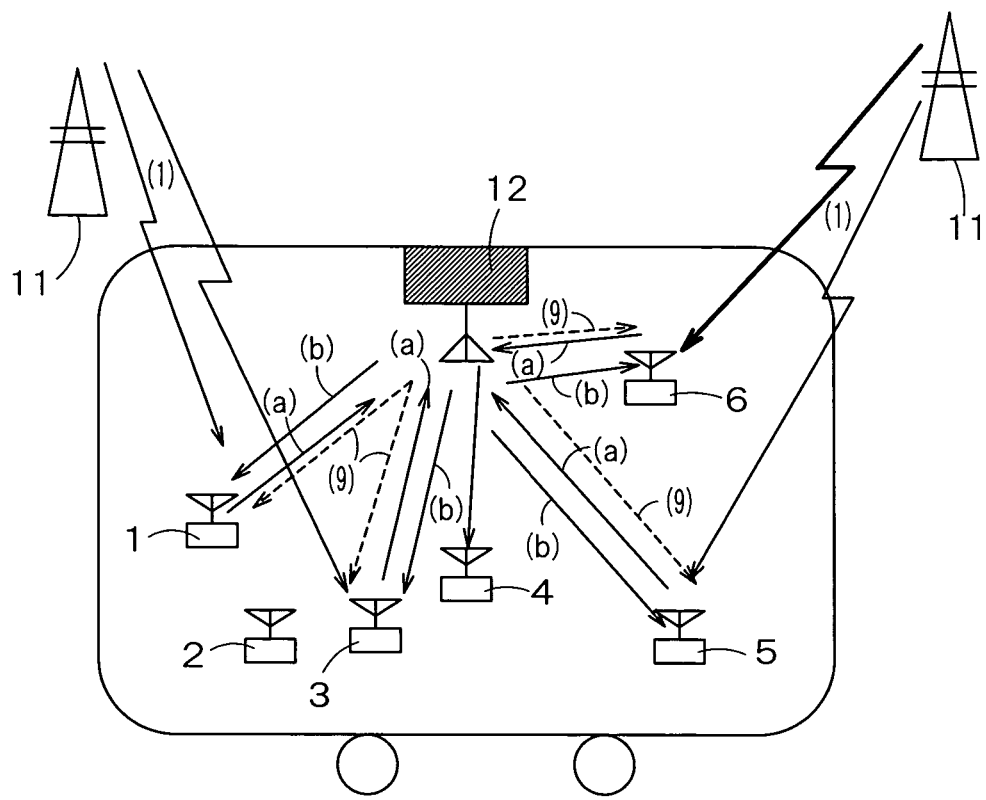
FIG. 9 is a diagram showing another network configuration according to the third embodiment of the distributed wireless network system.

FIG. 9 is a diagram showing another network configuration according to the third embodiment of the distributed wireless network system. In FIG. 9, there is shown an example in which when a plurality of wireless terminals cooperate with each other to receive information signal according to an assignment instruction from the control terminal 12 as shown in FIG. 2, the control terminal 12 relays the transmission of the supplement signal.

Points different from the method shown in FIG. 3 will be mainly explained below. In the method shown in FIG. 9, the respective wireless terminals receive an assignment instruction as shown in FIG. 3 from the control terminal 12, and individually receives an assignment signal (9) from the base station 11. Thereafter, in the method shown in FIG. 3, the respective wireless terminals transmit the received signal for the assigned part to other wireless terminals. But in the method shown in FIG. 9, the respective wireless terminals transmit the received signal (a) for the assigned part to the control terminal 12. The control terminal 12 then transmits a signal (b) for a part other than the assigned part to the respective terminals.

It may be determined by the control terminal 12 itself whether to relay the transmission of the supplement signal (4), or it may be determined by a wireless terminal which requests cooperation. In the latter case, the wireless terminal which requests cooperation transmits a cooperative reception request signal to the control terminal 12, and may transmit a signal indicating the presence of relay to the control terminal 12. As a result, for example, when a known user is nearby, the first or the second embodiment in which the information signal is transmitted without using the control terminal 12 can be selected, and the third embodiment in which transmit between users is not performed can be selected, according to the situation where there is no other user in the same network nearby.

As described above, in the third embodiment, since the deficiency information signal at the time of reception by the respective wireless terminals is received via the control terminal 12, it is not necessary to transmit the deficiency information signal between the respective wireless terminals, and hence security is improved.

Fourth Embodiment

In the fourth embodiment, the control terminal 12 itself transmits information signal between the base station 11 and the control terminal 12.

Figure 10:
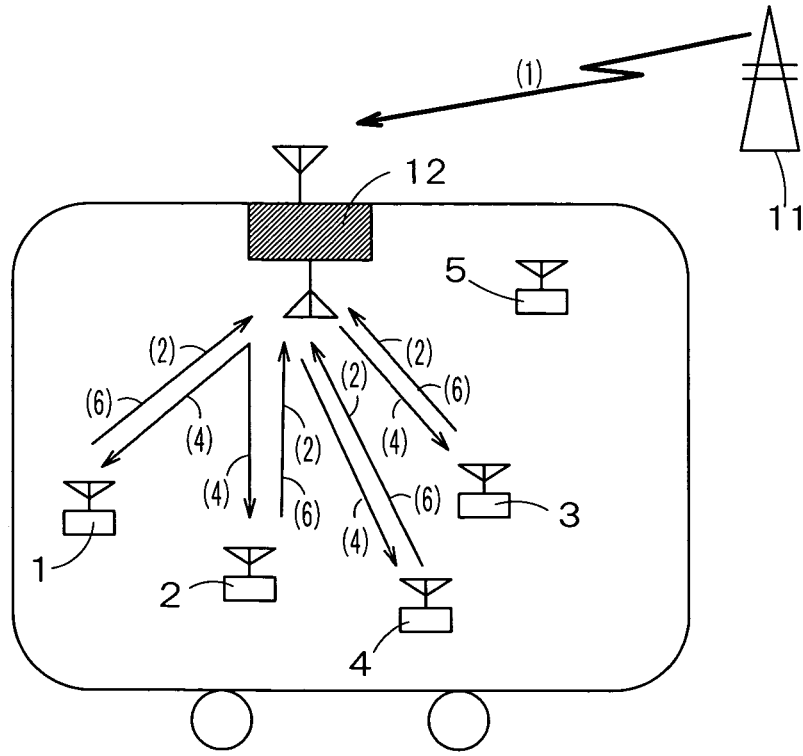
FIG. 10 is a diagram showing a network configuration according to the fourth embodiment of the distributed wireless network system.

FIG. 10 is a diagram showing a network configuration according to the fourth embodiment of the distributed wireless network system. The control terminal 12 in FIG. 10 can transmit information signal between the base station 11 and the respective wireless terminals. For example, in a vehicle such as a train or a bus or the like, the propagation environments of the respective wireless terminals held by passengers are not so good, whereas there are many cases in which the propagation environment of the control terminal 12 fitted on the ceiling or the like of the vehicle is good. In such a case, information signal from the base station 11 can be received more reliably and at a higher speed by the control terminal 12 than by the respective wireless terminals.

Therefore, in the fourth embodiment, the respective wireless terminals transmit a reception request signal to the control terminal 12, and the control terminal 12 receives desired information signal from the base station 11, based on the reception request signal, and transmits the received information signal to the respective wireless terminals.

Figure 11:
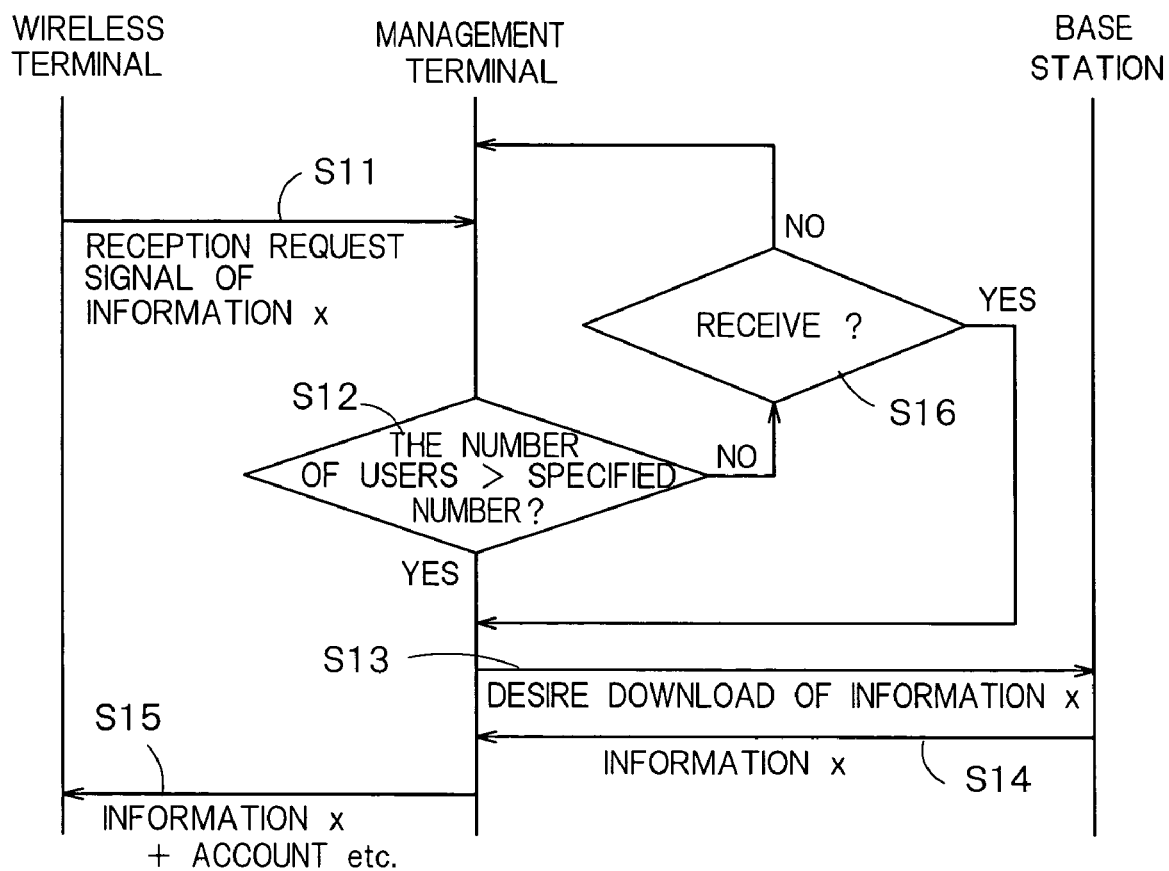
FIG. 11 is a flowchart showing the processing procedure according to the fourth embodiment.

FIG. 11 is a flowchart showing the processing procedure according to the fourth embodiment. At first, the respective wireless terminals in the distributed wireless network transmit the individual terminal information signal (2) for identifying themselves, and a desired received signal (6) indicating the type of information signal which the wireless terminals request reception, to the control terminal 12 (step S11).

The control terminal 12 stores the number of wireless terminals having transmitted the desired received signal (6) in the memory 24, and determines whether the value is larger than a specified number (step S12). When the value is larger than the specified number, the control terminal 12 requests reception of information signal 1 corresponding to the desired received signal (6) to the base station 11 (step S13), and receives the information signal (1) (step S14).

Upon completion of reception, the control terminal 12 performs accounting processing, and transmits the received information signal 4 to the wireless terminal having transmitted the desired received signal (6) (step S15).

On the other hand, when it is determined that the value is not larger than the specified number, it is determined whether to perform reception even if the number of the wireless terminals has not yet reached the specified number (step S16). If the determination is NO, control returns to step S11, and if YES, processing at step S13 is performed.

The specified number may be determined by the control terminal 12, or by the wireless terminal. For example, when it is determined by the control terminal 12, control is simple, but the degree of freedom according to the user's situation is low. On the other hand, when it is determined by the wireless terminal, the specified number can be changed according to the situation of the number of users, but processing such as transmitting the information signal relating to the situation of the number of users or the like to the wireless terminal becomes necessary.

At step S15, it is desirable to change a charged fare according to the number of wireless terminals which request reception. In other words, as the number of wireless terminals increases, the charged amount per one terminal is decreased.

As described above, in the fourth embodiment, the information signal, of which reception is requested by the respective wireless terminals, is received representatively by the control terminal 12, and distributed to the respective wireless terminals. Because of this, stable transmission becomes possible at all times, without relying on the propagation environments of the respective wireless terminals. Therefore, this embodiment is particularly effective, when the propagation environments from the base station 11 or the like of the respective wireless terminals are bad.

FIG. 12 and FIG. 13 are respectively illustrations showing a network configuration in modified examples of the fourth embodiment. As shown in FIG. 12, the wireless terminals 1 to 5 transmit information signal to each other, receive the same information signal 1 by cooperating with each other, and share the received information signal. The control terminal 12 may determine assignment for each wireless terminal and transmit an assignment signal (9) to the respective wireless terminals, or the assignment for each wireless terminal may be determined only by the information signal exchange between wireless terminals.

Even if the information signal is received by a plurality of wireless terminals by cooperating with each other, when there is still deficiency information signal, the processing shown in FIG. 11 is carried out. In this case, at least one wireless terminal transmits the evaluation signal (3) to the control terminal 12. For example, in FIG. 13, the wireless terminal 5 representatively transmits the individual terminal information signal (2) (here, information signal of the wireless terminals 1 to 5), and the evaluation signal (3).

The control terminal 12 receives the information signal for the relevant part from the base station 11 and the like, and distributes the information signal to the desired wireless terminals. As a result, the user receives only the necessity minimum deficiency information signal from the control terminal 12, thereby enabling reduction of the amount charged by the control terminal 12, while reliably receiving the whole necessary information signal. In FIGS. 10, 12 and 13, there is shown an example in which the control terminal 12 has a plurality of antennas, but the plurality of antennas are not always necessary, and the similar processing can be performed with only one antenna.

Fifth Embodiment

In the first to the fourth embodiments described above, there is shown an example in which one vehicle forms the distributed wireless network, but a plurality of vehicles may form the distributed wireless network.

Figure 14:
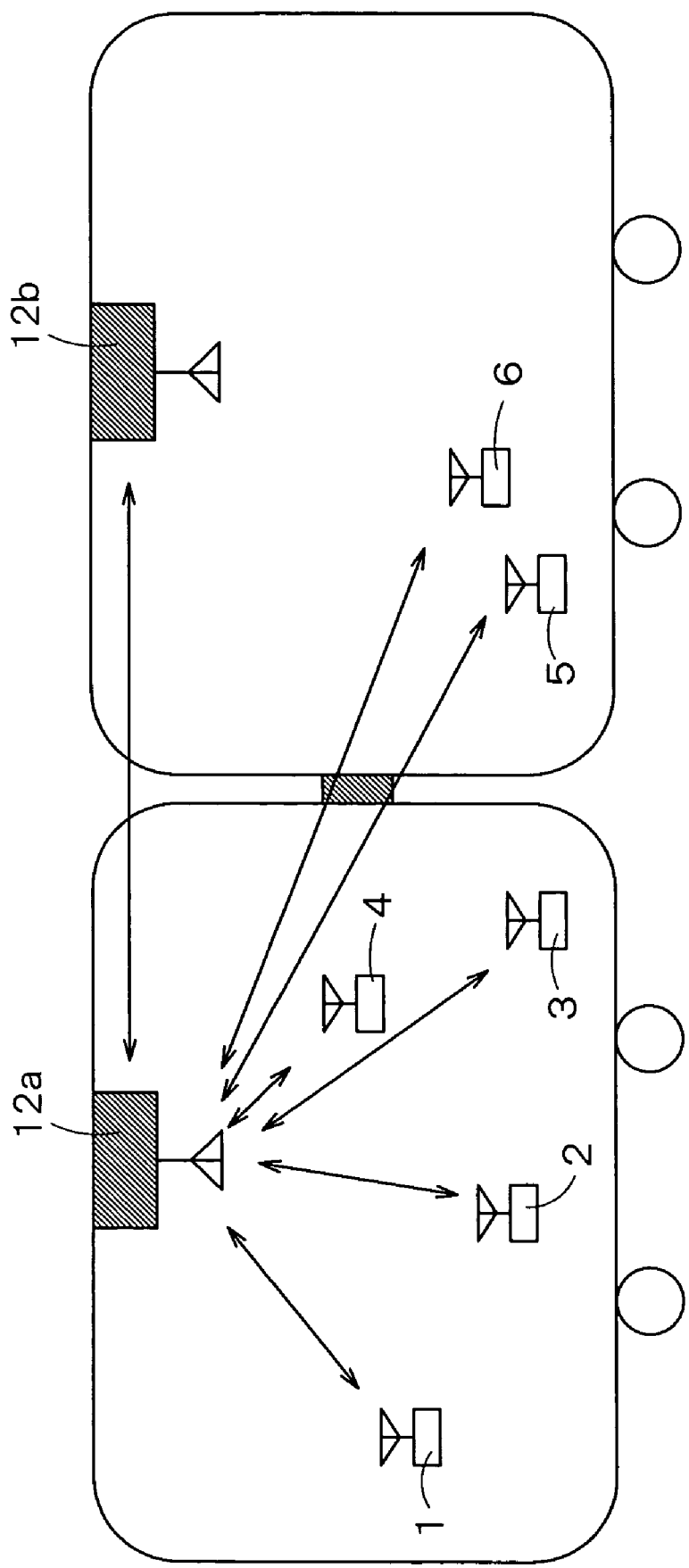
FIG. 14 is a diagram showing a network configuration in the fifth embodiment of the distributed wireless network system.

FIG. 14 is a diagram showing a network configuration in the fifth embodiment of the distributed wireless network system. FIG. 14 illustrates an example in which there are only a few wireless terminals in a vehicle. In this case, for efficient use of the system, it can be considered that one control terminal 12 controls wireless terminals in another vehicle.

In FIG. 14, there is shown a case in which the control terminal 12 is provided for each vehicle, but one control terminal 12 may be provided for a plurality of vehicles.

Figure 15:
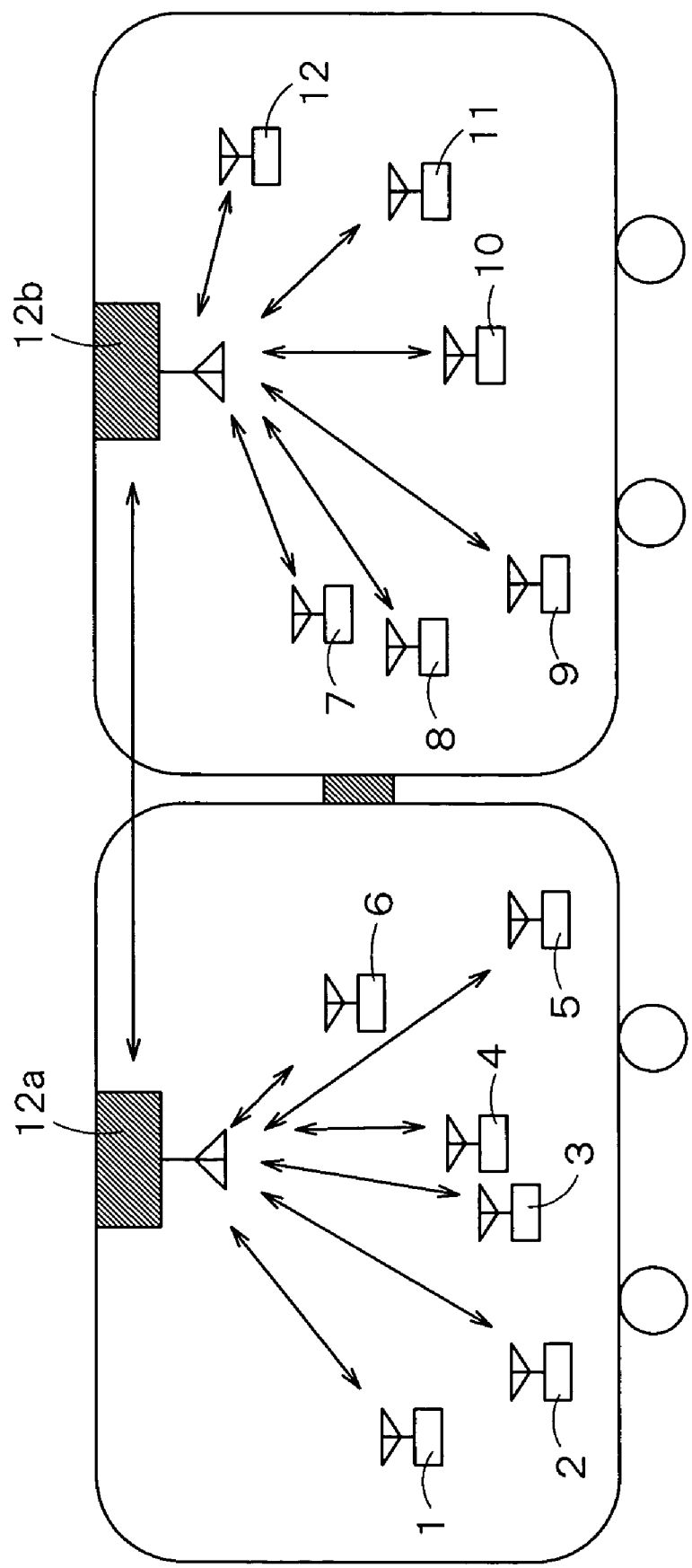
FIG. 15 illustrates a case in which the number of the wireless terminals existing in the vehicle is large.

FIG. 15 illustrates a case in which the number of the wireless terminals existing in the vehicle is large. For example, when there are only a few wireless terminals in the vehicle, as shown in FIG. 14, one control terminal 12 controls the wireless terminals in a plurality of vehicles, and as the number of wireless terminals increases, as shown in FIG. 15, separate control terminals 12a and 12b may control the wireless terminals in the respective vehicles for each vehicle.

In the case of FIG. 15, the respective control terminals 12a and 12b may transmit a control signal or the like to each other. Moreover, the service content (=received information signal) may be different for each of the control terminals 12a and 12b, or may be the same.

Particularly, the wireless terminal existing in the vicinity of the boundary of the wireless propagation range of the respective control terminals 12a and 12b may select the desired information signal, if the information signal is different for each of the control terminals 12a and 12b. Moreover, when the information signal received by the plurality of control terminals 12a and 12b is the same, it can be considered to select one having better wireless situation, or to combine the information signal from the both control terminals 12a and 12b.

As described above, in the fifth embodiment, since one control terminal 12 can control the wireless terminals in a plurality of vehicles, the number of the control terminals 12 can be reduced. Moreover, since the plurality of control terminals 12a and 12b can transmit a control signal or the like to each other, a larger scale distributed wireless network system can be constructed.

Other Embodiments

In the above respective embodiments, it is desired that the respective wireless terminals can access the distributed wireless network arbitrarily.

It is necessary to add information signal relating to the distributed wireless network with respect to a wireless terminal, which newly joins the distributed wireless network.

Figure 16:
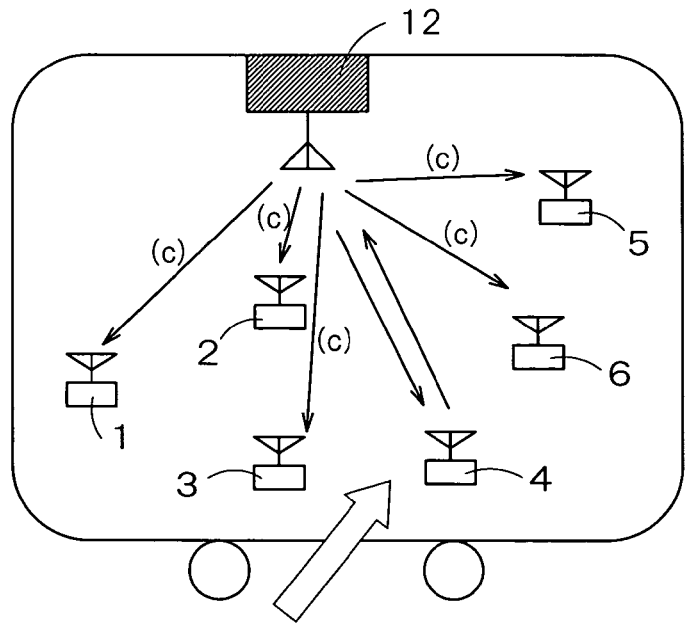
FIG. 16 illustrates an example in which information signal transmitted from the control terminal 12 to the wireless terminals for each fixed time or as required.
Figure 17:
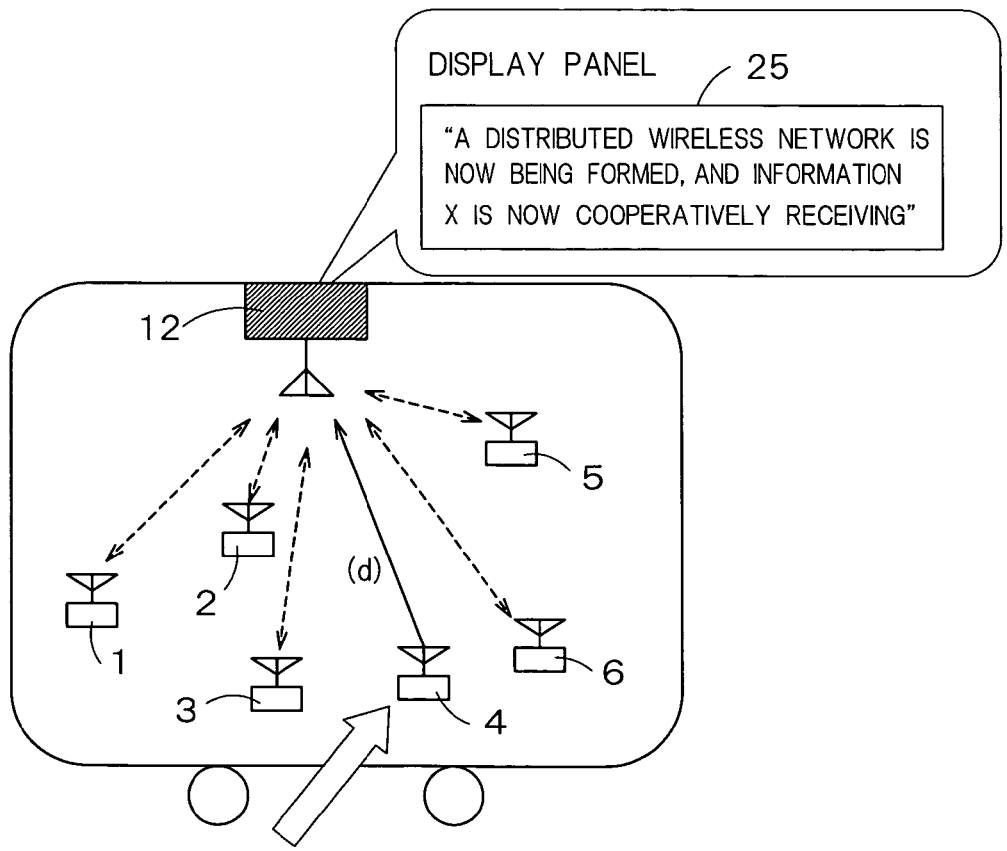
FIG. 17 is a diagram showing an example in which a wireless terminal newly entering at a range of a distributed wireless network acquires information signal relating to the distributed wireless network.

FIGS. 16 and 17 respectively illustrate an example in which the wireless terminal coming into the area of the distributed wireless network obtains the information signal relating to the distributed wireless network. FIG. 16 illustrates an example in which information signal transmitted from the control terminal 12 to the wireless terminals for each fixed time or as required, and basic information signal such as the number of users and an average bit rate (hereinafter, referred as distributed wireless network information signal (c)) are distributed to all wireless terminals located in the network.

FIG. 17 illustrates an example in which when the control terminal 12 has a display unit 25, the distributed wireless network information signal, for example, "a distributed wireless network is now being formed, and information signal x is now cooperatively receiving" is displayed on a display panel.

In the example shown in FIG. 16, the wireless terminal 4 which has newly moved into the distributed wireless network replies a distributed wireless network joining request signal (d) to the distributed wireless network information signal (c) provided from the control terminal 12, thereby joining the distributed wireless network. Likewise, even in the example shown in FIG. 17, the wireless terminal 4 transmits the same signal (d) to the control terminal 12, thereby joining the distributed wireless network.

In the above description, a train or a bus or the like has been described as an example, but the similar system can be constructed even in other places. Moreover, in the above description, the control terminal 12 is assumed to be a dedicated terminal, but the control terminal 12 is not necessarily the dedicated terminal. For example, the control terminal 12 may be selected from wireless terminals belonging to the distributed wireless network. As the selection method, for example, it is arranged such that the base station 11 or the like outside the distributed wireless network transmits the same signal to the respective wireless terminals in the distributed wireless network at the same time, and the respective wireless terminals reply Ack upon reception of the signal. The base station 11 or the like selects a terminal suitable as the control terminal 12, based on the information signal such as the reception time of Ack and the intensity of the received signal from the respective terminals.

What is claimed is:

1. A wireless control apparatus which performs a wireless communication with a plurality of wireless terminals, comprising:

an evaluation signal receiver which receives evaluation signals relating to received signals in the respective wireless terminals, which are transmitted from said plurality of wireless terminals;

a supplement signal generating unit configured to generate a supplement signal necessary to supplement deficient part of the received signals in said plurality of wireless terminals, using the evaluation signal; and a supplement signal transmitter which transmits the supplement signal decided by said supplement signal generating unit, to said plurality of wireless terminals, wherein the evaluation signals are signals that indicate at least one of a deficient part in the received information signal at said wireless terminals, propagation environment, and capability of wireless terminals;

wherein the supplement signal is a signal instructed to a wireless terminal capable of correctly receiving information signal, to receive the information signal instead of a wireless terminal not being able to correctly receive the information signal.

2. The wireless control apparatus according to claim 1, wherein the supplement signal is a signal which indicates information to be cooperatively received by said plurality of wireless terminals.

3. The wireless control apparatus according to claim 1, further comprising a terminal information signal register unit configured to register terminal information signal including at least one of transmission speed, propagation environment, processing state and request information signal for said plurality of wireless terminals.

4. The wireless control apparatus according to claim 1, further comprising:

a supplement information signal receiver which receives the information signal received based on the supplement signal by said plurality wireless terminals; and a supplement information signal transmitter which transmits the information signal received by said supplement information signal receiver to said plurality of wireless terminals.

5. The wireless control apparatus according to claim 1, further comprising:

a supplement information signal receiver which receives at least part of information signal to be received by at least one of said plurality of wireless terminals; and a supplement information signal transmitter which transmits the information signal received by said information signal receiver to the corresponding wireless terminal, based on the supplement signal.

6. The wireless control apparatus according to claim 1, further comprising:

a distributed wireless network information signal transmitter which transmits information signal necessary to form a distributed wireless network, to surrounding wireless terminals including said plurality of wireless terminals, by every a prescribed time.

7. The wireless control apparatus according to claim 1, further comprising:

a detector which detects a state of forming a distributed wireless network; and a display unit which displays information relating to the state of forming the distributed wireless network.

8. A wireless terminal configured to performs wireless communication with a wireless control apparatus which transmits a supplement signal necessary to supplement a received signal, comprising:

a transmitter which transmits an evaluation signal relating to the received signal to said wireless control apparatus;

a supplement signal receiver which receives the supplement signal; and a supplement information signal receiver which receives information signal based on the supplement signal;

wherein said evaluation signal is a signal indicative of at least one of deficient part of the received information signal, propagation environment and terminal capability;

wherein the supplement signal is a signal which indicates to receive information signal instead of an other wireless terminal which cannot correctly receive the information signal when it is possible to correctly receive the information signal to be received.

9. The wireless terminal according to claim 8, further comprising a supplement information signal communication unit configured to transmit and receive the information signal received by said supplement information signal receiver and the information signal received by the other wireless terminals based on the supplement signal, with the other wireless terminals to each other.

10. The wireless terminal according to claim 8, further comprising a supplement information signal communication unit configure to transmit the information signal received by said supplement information signal receiver to said wireless control apparatus, and receives the information signal received by the other wireless terminals based on the supplement signal via said wireless control apparatus.

11. The wireless terminal according to claim 8, wherein the supplement signal is a signal indicative of information signal to be cooperatively received.

12. The wireless terminal according to claim 8, further comprising a terminal information storage which stores terminal information including at least one of transmission speed, propagation environment, processing state and request information.

13. A communication control method which communicates with a wireless control apparatus which performs wireless communication with said a plurality of wireless terminals, comprising:

receiving evaluation signals at an evaluation signal receiver of said wireless control apparatus, transmitted from the respective wireless terminals;

generating a supplement signal necessary to supplement deficient part of the received signals received at said plurality of wireless terminals, using the evaluation signal; and transmitting said supplement signal to said plurality of wireless terminals wherein the evaluation signals are signals that indicate at least one of a deficient part in the received information signal at said wireless terminals, propagation environment, and capability of wireless terminals;

wherein the supplement signal is a signal instructed to a wireless terminal capable of correctly receiving information signal, to receive the information signal instead of a wireless terminal not being able to correctly receive the information signal.

14. The communication control method according to claim 13, wherein the supplement signal is a signal which indicates information to be cooperatively received by said plurality of wireless terminals.

* * * * *